United States Patent
Song et al.

(10) Patent No.: US 11,713,805 B2
(45) Date of Patent: Aug. 1, 2023

(54) SPHERE TYPE SHIFT CONTROL APPARATUS FOR ELECTRONIC SHIFT SYSTEM

(71) Applicants: HYUNDAI MOTOR COMPANY, Seoul (KR); KIA CORPORATION, Seoul (KR); SL Corporation, Daegu (KR)

(72) Inventors: Min Gi Song, Seoul (KR); Ki Young Song, Suwon-si (KR); Dae Hyung Kim, Gyeongsan-si (KR); Ji Hoon Yang, Gyeongsan-si (KR)

(73) Assignees: HYUNDAI MOTOR COMPANY, Seoul (KR); KIA CORPORATION, Seoul (KR); SL Corporation, Daegu (KR)

( * ) Notice: Subject to any disclaimer, the term of this patent is extended or adjusted under 35 U.S.C. 154(b) by 50 days.

(21) Appl. No.: 17/399,366

(22) Filed: Aug. 11, 2021

(65) Prior Publication Data
US 2022/0154816 A1    May 19, 2022

(30) Foreign Application Priority Data
Nov. 13, 2020  (KR) .......................... 10-2020-0152031

(51) Int. Cl.
*F16H 59/08* (2006.01)
*F16H 59/04* (2006.01)

(52) U.S. Cl.
CPC ........... *F16H 59/08* (2013.01); *F16H 59/044* (2013.01); *F16H 2059/081* (2013.01)

(58) Field of Classification Search
CPC .. F16H 59/08; F16H 59/044; F16H 2059/081; Y10T 74/20396; G05G 9/047;
(Continued)

(56) References Cited

U.S. PATENT DOCUMENTS

| 6,144,370 A  | * | 11/2000 | Eleyan ................ G06F 3/03549 345/167 |
| 7,965,282 B2 | * | 6/2011  | Yamada ................ B60K 37/06 345/184 |

(Continued)

FOREIGN PATENT DOCUMENTS

| JP | 2002337715 A | * | 11/2002 |
| JP | 2014156153 A | * | 8/2014 |

(Continued)

OTHER PUBLICATIONS

Final Office Action dated Dec. 20, 2022 cited in corresponding U.S. Appl. No. 17/015,701; 11 pp.
(Continued)

*Primary Examiner* — T. Scott Fix
(74) *Attorney, Agent, or Firm* — Lempia Summerfield Katz LLC

(57) ABSTRACT

A sphere type shift control apparatus for an electronic shift system has a sphere member rotated with respect to a housing by power from a motor, and the rotation of the sphere member is restricted by holding torque of the motor, such that it is possible to implement a shift lock. Further, since a user can forcibly manually rotate the sphere member, the function of shift lock release can be implemented.

12 Claims, 13 Drawing Sheets

(58) Field of Classification Search
CPC ......... G05G 9/053; G05G 2009/04707; G05G 2009/04711; G05G 2009/04714; G05G 3/033; G05G 3/0354
USPC .............................. 74/473.3, 473.33, 473.34
See application file for complete search history.

(56) References Cited

U.S. PATENT DOCUMENTS

| | | |
|---|---|---|
| 9,303,755 B2 | 4/2016 | Kim |
| 9,322,469 B2 | 4/2016 | Kim |
| 10,364,883 B2 | 7/2019 | Kim |
| 2006/0096406 A1 | 5/2006 | Liu |
| 2015/0107393 A1* | 4/2015 | Kim ...................... G05G 9/053 74/473.34 |
| 2017/0227118 A1 | 8/2017 | Buttolo |
| 2017/0227119 A1 | 8/2017 | Buttolo et al. |
| 2019/0032772 A1* | 1/2019 | Kim ........................ F16H 59/08 |

FOREIGN PATENT DOCUMENTS

| | | | |
|---|---|---|---|
| KR | 20120001949 A | * | 1/2012 |
| KR | 10-2019-0050374 A | | 5/2019 |

OTHER PUBLICATIONS

Danielle Collins, FAQ: What are Hall effect sensors and what is their role in DC motors?, Motion Control Tips, Jan. 11, 2017, 7 pp.
Final Office Action dated Apr. 3, 2023 cited in corresponding U.S. Appl. No. 17/015,701; 10 pp.

\* cited by examiner

SPHERE TYPE SHIFT CONTROL APPARATUS FOR ELECTRONIC SHIFT SYSTEM

CROSS REFERENCE TO RELATED APPLICATION

This application claims priority to and the benefits of Korean Patent Application No. 10-2020-0152031, filed on Nov. 13, 2020, the entire contents of which are incorporated herein by reference.

FIELD

The present disclosure relates to a sphere type shift control apparatus for an electronic shift system.

BACKGROUND

The statements in this section merely provide background information related to the present disclosure and may not constitute prior art.

In general, in vehicles equipped with an automatic transmission, gears of desired shift stages are automatically operated by controlling hydraulic pressure within a shift range set for the speed of the vehicles.

An automatic transmission generates gear ratios using a hydraulic circuit, a planetary gear set, and friction members to shift and these components are controlled by a Transmission Control Unit (TCU).

Unlike existing mechanical shifting systems, Shift-by-Wire (hereafter, referred to as an SBW) system is an electronic shifting system without a mechanical connecting structure such as a cable between a transmission and a shift control apparatus (a lever, a button, or a dial). The electronic shifting system is a system in which when a signal generated by operating an electronic shift control apparatus is transmitted to a transmission control unit (TCU), a transmission actuator (a shift cable motor or a select cable motor) is operated in response to an electronic signal generated by the TCU and hydraulic pressure is applied or blocked to hydraulic circuits respectively provided for gear stages by operation of the transmission actuator, thereby electronically performing shift control.

Accordingly, an automatic transmission associated with the SBW system enables gear-shifting into a D-state, an R-stage, and a Null-stage (Nd-stage or Nr-stage) by transmitting the a driver's intention to change gear stages to the TCU using an electrical signal by simply operating an electronic shift control apparatus.

The description provided above as a related art of the present disclosure is just for helping understanding the background of the present disclosure and should not be construed as being included in the related art known by those skilled in the art.

SUMMARY

The present disclosure provides a sphere type shift control apparatus for an electronic shift system in which a sphere member having a shifting part at one semispherical side and a design part for indirect lighting and image transmission at an opposite semispherical side is rotated 180 degrees such that the positions of the shifting part and the design part are switched, and that has a release function enabling a user to manually rotate the sphere member, if desired, so that safety can be improved.

In one form of the present disclosure, a sphere type shift control apparatus for an electronic shift system includes: a sphere member having a shifting part at one semispherical side and a design part at an opposite semispherical side, and coupled to be rotatable with respect to a housing, in which the sphere member is rotated with respect to the housing by power from a motor or is manually rotated by a user.

A rotary shaft disposed through a center of the sphere member may be coupled to be rotatable with respect to the housing, and the apparatus may further include: gears connected to the motor; and a clutch assembly disposed between the gears and the rotary shaft to transmit power or stop power transmission.

The clutch assembly may maintain a connected state so that rotational force of the gears is transmitted to the rotary shaft when the gears are rotated by power from the motor.

The clutch assembly may be disengaged such that rotational force of the sphere member is not transmitted to the gears when the sphere member is manually rotated by a user.

The gears may include: a worm gear coupled to a motor shaft; an intermediate gear engaged with the worm gear; and a final gear engaged with the intermediate gear, fitted on the rotary shaft passing through a center thereof to rotate with respect to the rotary shaft, and connected to the clutch assembly.

The clutch assembly may include: a first clutch block integrally fitted on the rotary shaft passing through a center thereof; a second clutch block fitted in the final gear to integrally rotate, fitted on the rotary shaft passing through a center thereof, and being able to move in a longitudinal direction of the rotary shaft to be engaged with or disengaged from the first clutch block; and a clutch spring disposed with both ends supported by the final gear and the second clutch block.

When the second clutch block is engaged with the first clutch block by elasticity of the clutch spring, the clutch assembly may enter a connected state in which power can be transmitted; and when the second clutch block is moved toward the final gear against the elasticity of the clutch spring and disengaged from the first clutch block, the clutch assembly may enter a disconnected state in which power cannot be transmitted.

Several spline grooves elongated in the longitudinal direction of the rotary shaft may be formed on an inner surface of the final gear; spline protrusions that are fitted in the spline grooves may be foiled on an outer surface of the second clutch block in the same number as the spline grooves; and the final gear and the second clutch block may be integrally rotated when the spline grooves and the spline protrusions are fitted to each other, and the second clutch block may move with respect to the final gear in the longitudinal direction of the rotary shaft.

First protrusions and second protrusions that protrude toward each other may be circumferentially continuously famed on surfaces facing each other of the first clutch block and the second clutch block, respectively; when the second clutch block is moved to the first clutch block by elasticity of the clutch spring, the second protrusions are fitted between the first protrusions, and the first protrusions are fitted between the second protrusions, the first clutch block and the second clutch block may be engaged into a connected state in which power can be transmitted; and when the second clutch block is moved to the final gear against the elasticity of the clutch spring and the first protrusions and the second protrusions are decoupled, the first clutch block and the second clutch block may be disengaged into a disconnected state in which power cannot be transmitted.

The first protrusions and the second protrusions may have inclined surfaces and vertical surfaces, respectively, so when the first protrusions and the second protrusions are fitted to each other, the inclined surfaces may come in contact with each other and the vertical surfaces may come in contact with each other.

When rotational power of the motor is transmitted to the second clutch block through the gears with the first protrusions and the second protrusions fitted to each other, the second clutch block may be rotated in a direction in which the vertical surfaces of the second protrusions come in contact with the vertical surfaces of the first protrusion or may be rotated in a direction in which the inclined surfaces of the second protrusions come in contact with the inclined surfaces of the first protrusions; rotational force of the second clutch block may be transmitted to the first clutch block by engagement of the first protrusions and the second protrusions, and rotational force of the first clutch block may be transmitted to the sphere member through the rotary shaft, so the sphere member may be rotated with respect to the housing by the power from the motor.

When the second clutch block is rotated by the power from the motor only in the direction in which the vertical surfaces of the second protrusions come in contact with the vertical surfaces of the first protrusions, the sphere member may be rotated 180 degrees at one time only clockwise with respect to the rotary shaft, and the shifting part and the design part of the sphere member may be alternately exposed one time to an interior of a vehicle.

When the second clutch block is rotated by the power from the motor 180 degrees in the direction in which the vertical surfaces of the second protrusions come in contact with the vertical surfaces of the first protrusions, the sphere member may be rotated 180 degrees clockwise with respect to the rotary shaft and the shifting part may be exposed to the interior; and when the second clutch block is rotated 180 degrees in an opposite direction in which the inclined surfaces of the second protrusions come in contact with the inclined surfaces of the first protrusions with the shifting part exposed to the interior, the sphere member may be rotated 180 degrees counterclockwise with respect to the rotary shaft and the design part may be exposed to the interior.

Since torque of the motor is larger than spring force of the clutch spring, the first clutch block and the second clutch block may not be spaced from each other when the second clutch block is rotated in the opposite direction in which the inclined surfaces of the second protrusions come in contact with the inclined surfaces of the first protrusions, the first protrusions and the second protrusions may keep engaged with each other, and rotational force of the second clutch block may be transmitted to the first clutch block.

When the sphere member is manually rotated by a user in the direction in which the inclined surfaces of the first protrusions come in contact with the inclined surfaces of the second protrusions with the first protrusions and the second protrusions fitted to each other, the inclined surfaces of the first protrusions may move on the inclined surfaces of the second protrusions and the second clutch block may be moved to the final gear against the elasticity of the clutch spring; and the first protrusions and the second protrusions may be separated from each other by the movement of the second clutch block, and the first clutch block and the second clutch block may be disengaged from each other into the disconnected state in which power cannot be transmitted, so the sphere member may be manually rotated with respect to the housing.

According to one form of the present disclosure, the sphere type shift control apparatus has a shifting part that is provided at one semispherical side of a sphere member for a user to operate to shift, and a design part that is provided at the opposite semispherical side for indirect lighting and image transmission, such that only the shifting part is exposed to the interior of a vehicle through an opening of a housing when it is desired to shift by rotating the sphere member, and only the design part is exposed to the interior of the vehicle through the housing when it is not required to shift. Accordingly, it is possible to improve stability by improving visibility and to improve the commercial value by implementing a high-tech image.

Further, according to the present disclosure, since the sphere member is rotated with respect to the housing by the power from the motor and the rotation of the sphere member is restricted by holding torque of the motor, it is possible to implement a shift lock. Further, since a user can forcibly manually rotate the sphere member, the function of shift lock release can be implemented, so safety can be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
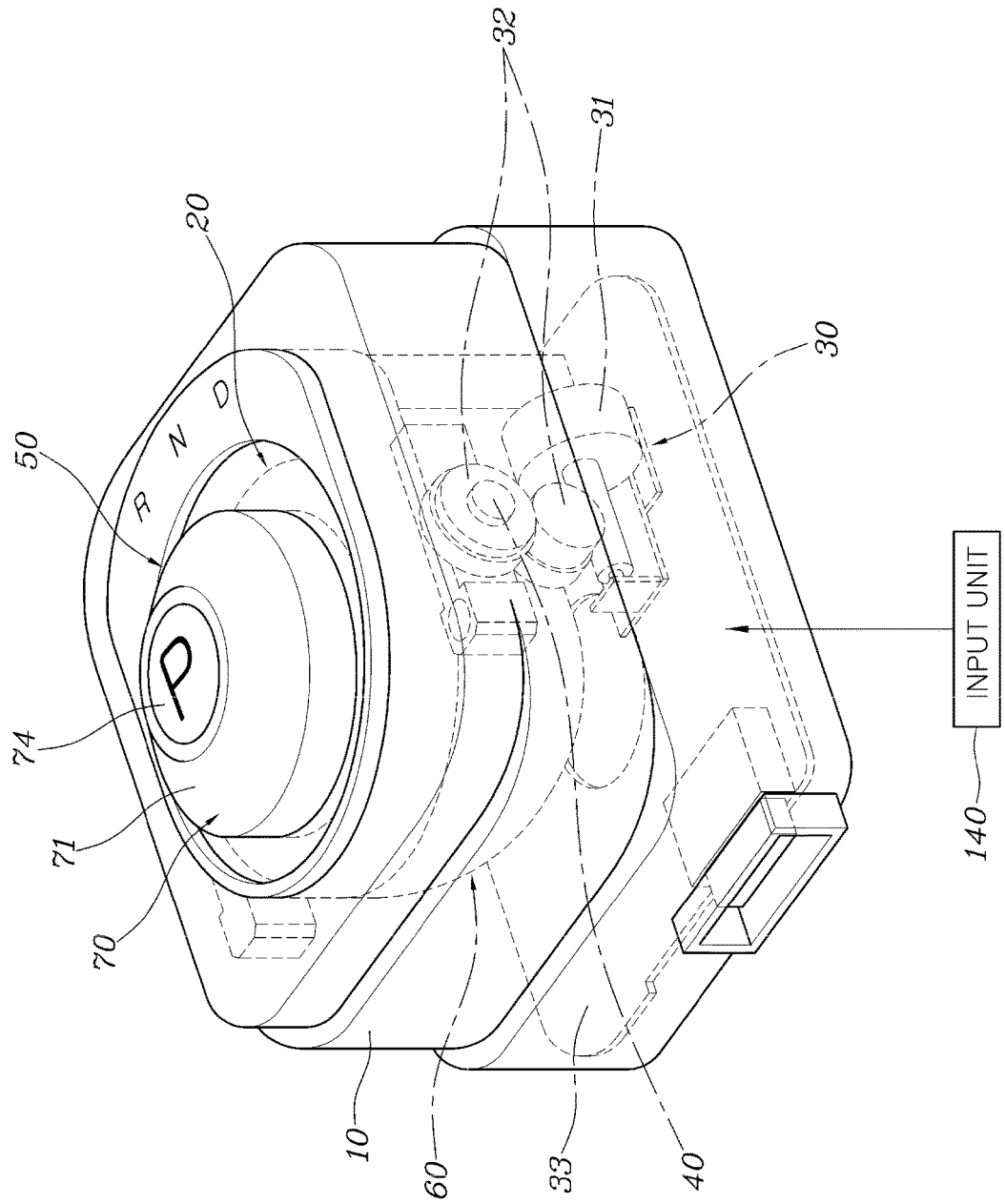
FIGS. 1 and 2 are perspective views of a sphere type shift control apparatus having a shift dial according to one form of the present disclosure.
Figure 2:
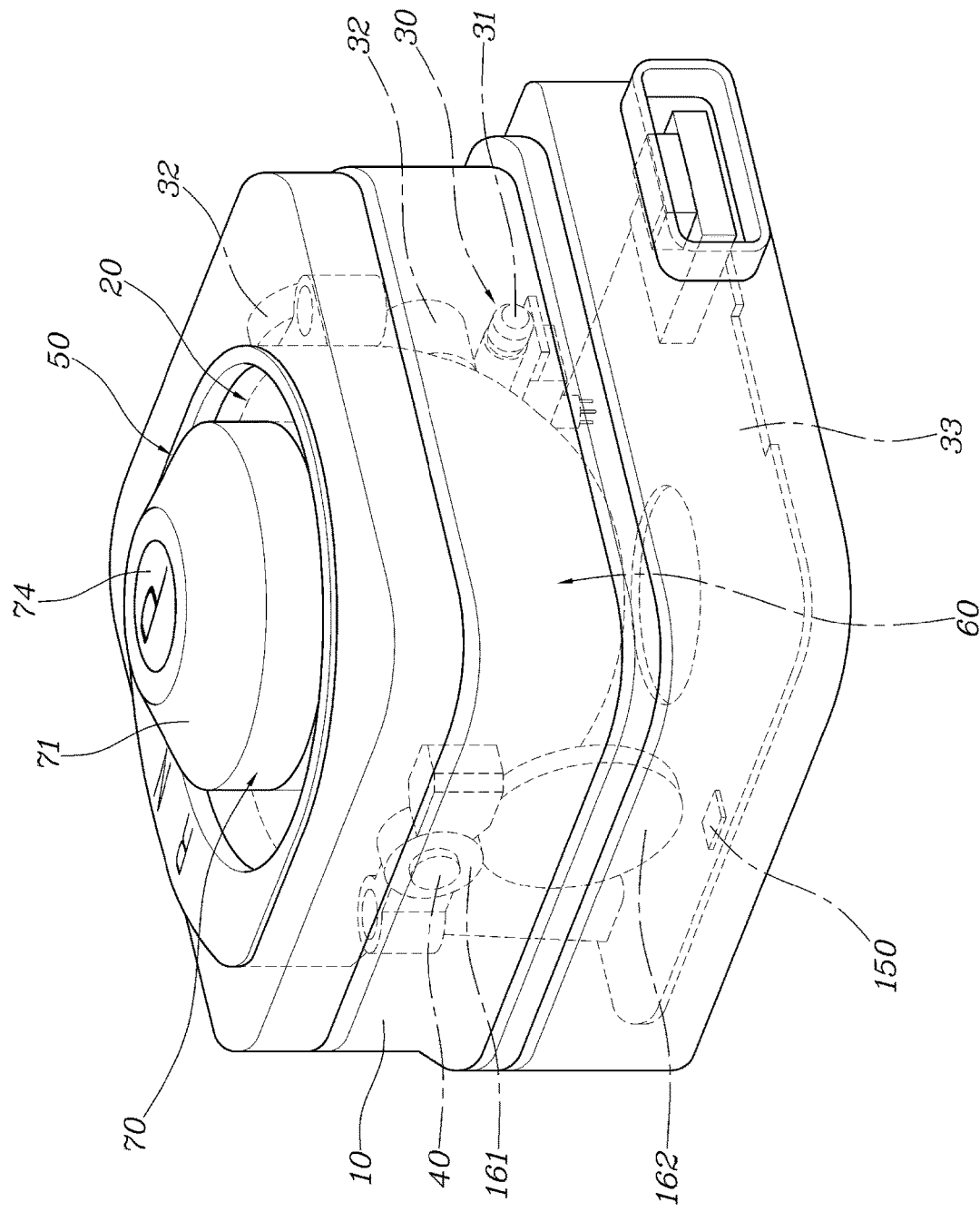
Figure 3:
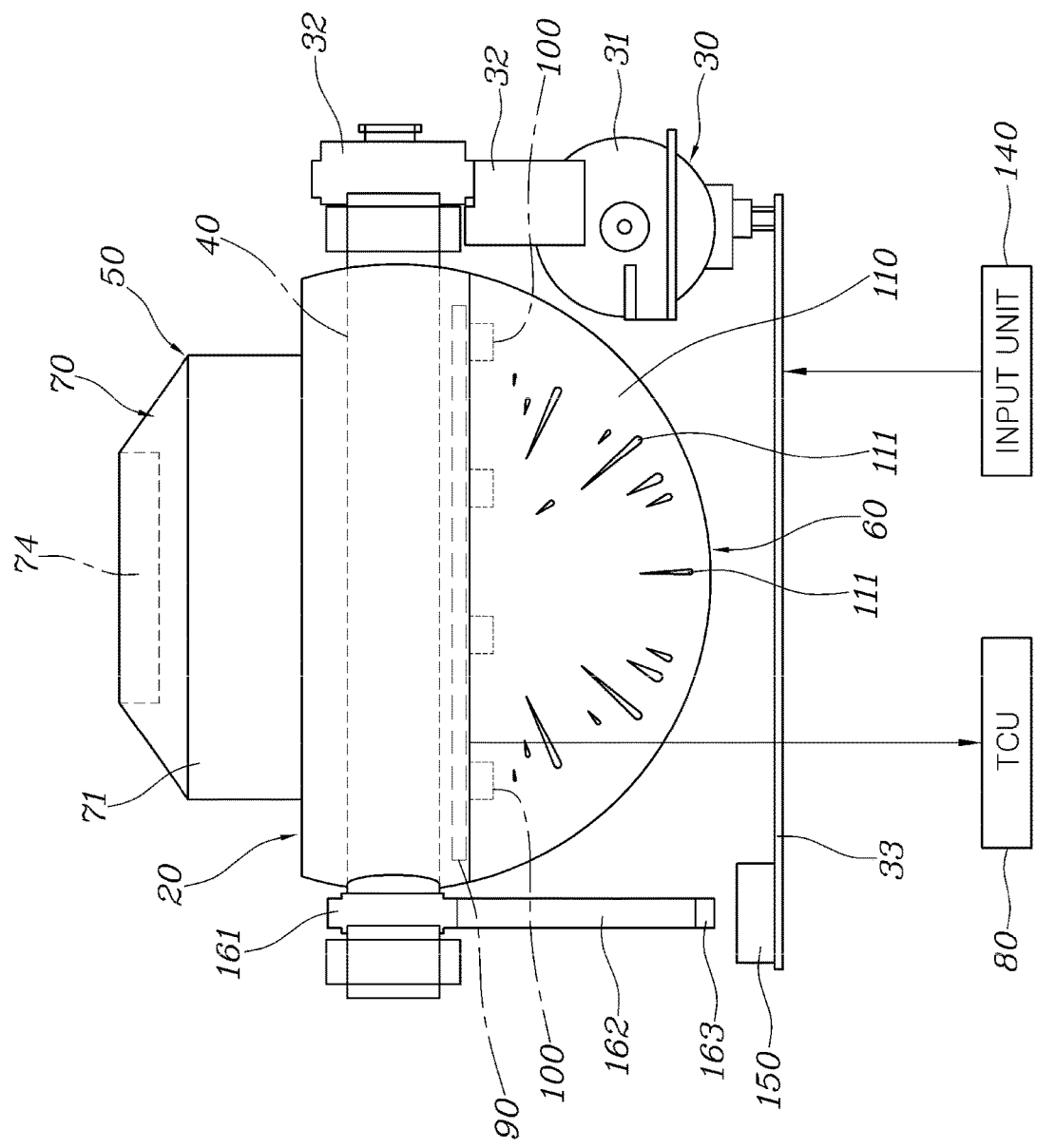
FIG. 3 is a front view with a housing removed in FIG. 1.
Figure 4:
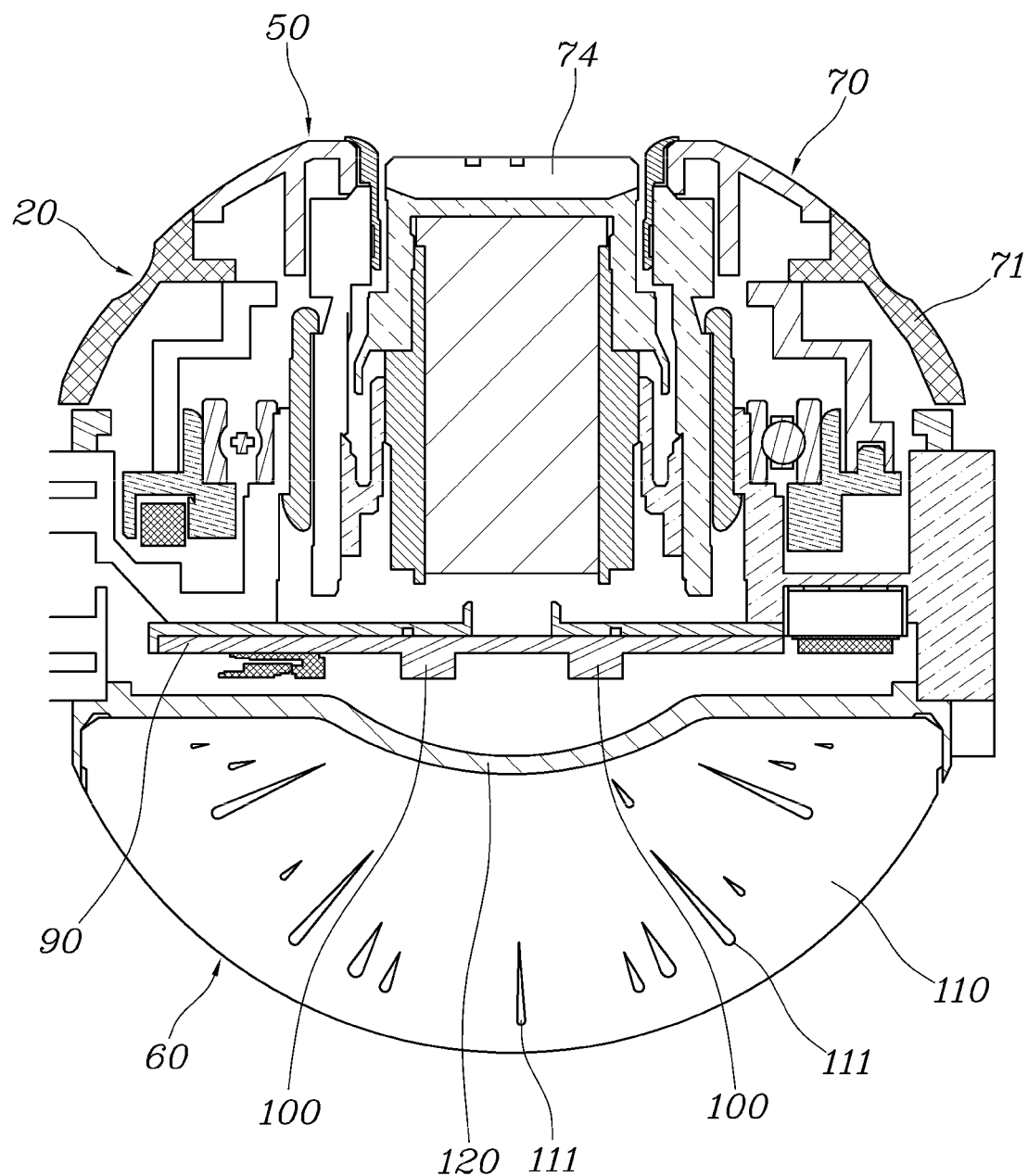
FIG. 4 is a cross-sectional view of FIG. 3.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, the structural or functional description specified to exemplary forms according to the concept of the present disclosure is intended to describe the exemplary forms, so it should be understood that the present disclosure may be variously embodied, without being limited to the exemplary forms.

Forms described herein may be changed in various ways and various shapes, so specific forms are shown in the drawings and will be described in detail in this specification. However, it should be understood that the exemplary forms according to the concept of the present disclosure are not limited to the forms which will be described hereinbelow with reference to the accompanying drawings, but all modifications, equivalents, and substitutions are included in the scope and spirit of the present disclosure.

It will be understood that, although the terms first, second, etc. may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

Terms used in the present disclosure are used only in order to describe specific exemplary forms rather than limiting the present disclosure. Singular forms are intended to include plural forms unless the context clearly indicates otherwise. It will be further understood that the terms "comprises" or "have" used in this specification specify the presence of stated features, numerals, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

A control unit (controller) according to exemplary forms of the present disclosure can be implemented through a nonvolatile memory (not shown) configured to store algorithms for controlling operation of various components of a vehicle or data about software commands for executing the algorithms, and a processor (not shown) configured to perform operation to be described below using the data stored in the memory. The memory and the processor may be individual chips. Alternatively, the memory and the processor may be integrated in a single chip. The processor may be implemented as one or more processors.

A sphere type shift control apparatus for an electronic shift system according to exemplary forms of the present disclosure is described hereafter in detail with reference to the accompanying drawings.

A sphere type shift control apparatus for an electronic shift system according to one form of the present disclosure, as shown in FIGS. 1 to 13, includes a housing 10, a sphere member 20 coupled to be rotatable with respect to the housing, and an actuating unit 30 providing a rotational force to enable the sphere member 20 to rotate with respect to the housing 10.

The housing 10 is installed around a driver seat, that is, in the console, the center fascia, or the like that a driver can reach.

A rotary shaft 40 is disposed through the center of the sphere member 20 to be able to rotate with respect to the housing 10.

Accordingly, when the rotary shaft 40 is rotated, the sphere member 20 is also rotated with respect to the housing 10, and in this process, one semispherical side of the sphere member 20 is exposed to the interior of a vehicle from the housing 10 and the opposite semispherical side is hidden in the housing 10.

A shifting part 50 is provided at one semispherical side of the sphere member 20 and a design part 60 is provided at the opposite semispherical side.

When the sphere member 20 is rotated with respect to the housing 10, one of the shifting part 50 and the design part 60 is exposed to the interior of a vehicle and the other one is hidden in the housing 10.

The shifting part 50 has a shift member 70 that a driver operates to shift and the shift member 70 may be a shift dial 71, as shown in FIGS. 1 to 4, or may be any one of a shift button unit or a shift lever.

When the shift member 70 is a shift dial 71 or a shift lever, a P-stage button 74 may be separately additionally provided.

Any one stage of an R-stage, an N-stage, and a D-stage can be selected by operating the shift dial 71 and a P-stage is selected by pressing the P-stage button 74.

When the shift member 70 is a shift button unit, a driver selects and presses any one of a P-stage button, an R-stage button, an N-stage button, and a D-stage button.

When the shift member 70 is a shift lever, any one stage of an R-stage, an N-stage, and a D-stage can be selected by a driver rotating the shift lever and a P-stage is selected by pressing the separate P-stage button 74.

An exemplary form of the present disclosure further includes a first Printed Circuit Board (PCB) 90 that receives an operation signal of the shift member 70 and outputs a control signal to a Transmission Control Unit (TCU) 80. The first PCB 90 may be fixed to the sphere member 20 to face the shift member 70.

When an operation signal of the shift member 70 is generated, the first PCB 90 transmits a signal to the TCU 80 and a transmission actuator is operated in response to an instruction signal from the TCU 80. As the transmission actuator is operated, hydraulic pressure is applied or blocked to each stages of a transmission, whereby shift control is electronically performed.

The design part 60 includes a light source 100 coupled to the first PCB 90 and being controlled to be turned on and off by the first PCB 90, and a light window 110 having a specific pattern 111 on the surface to be able to implement indirect lighting when the light source 100 is turned on.

The light source 100 coupled to the first PCB 90 is an LED. When the light source 100 is turned on, ambient light can be implemented. In particular, a welcome function responding to a gesture of a user can also be implemented.

The light window 110 may be made of semispherical tempered glass and may be a transparent window or a translucent window that can transmit light from the light source 100.

The design part 60 further includes a diffuser 120 that diffuses the light from the light source 100. The diffuser 120 is coupled to the light window 110 to face the light source 100 and, for example, may be a prism.

Figure 6:
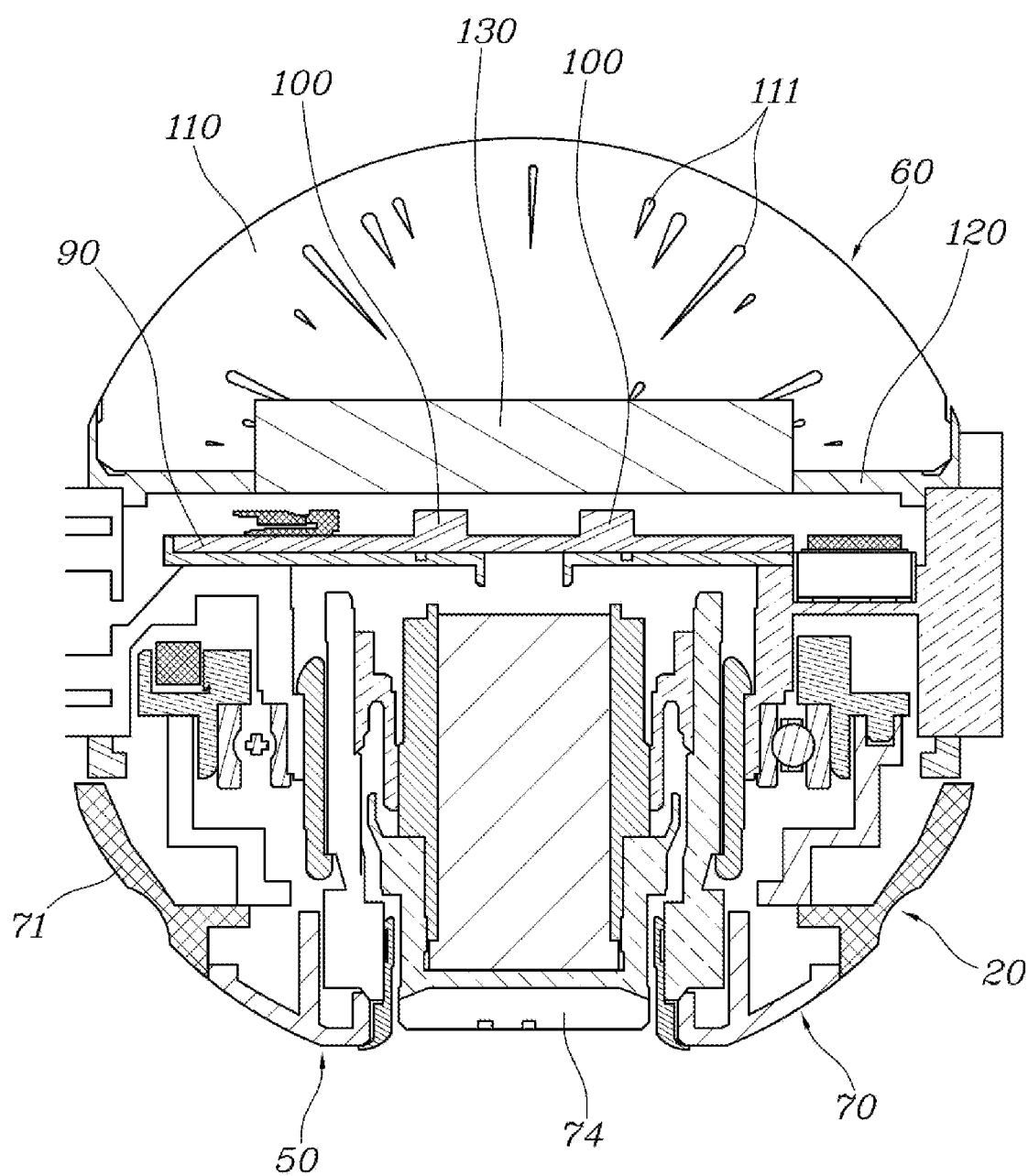
Figure 7:
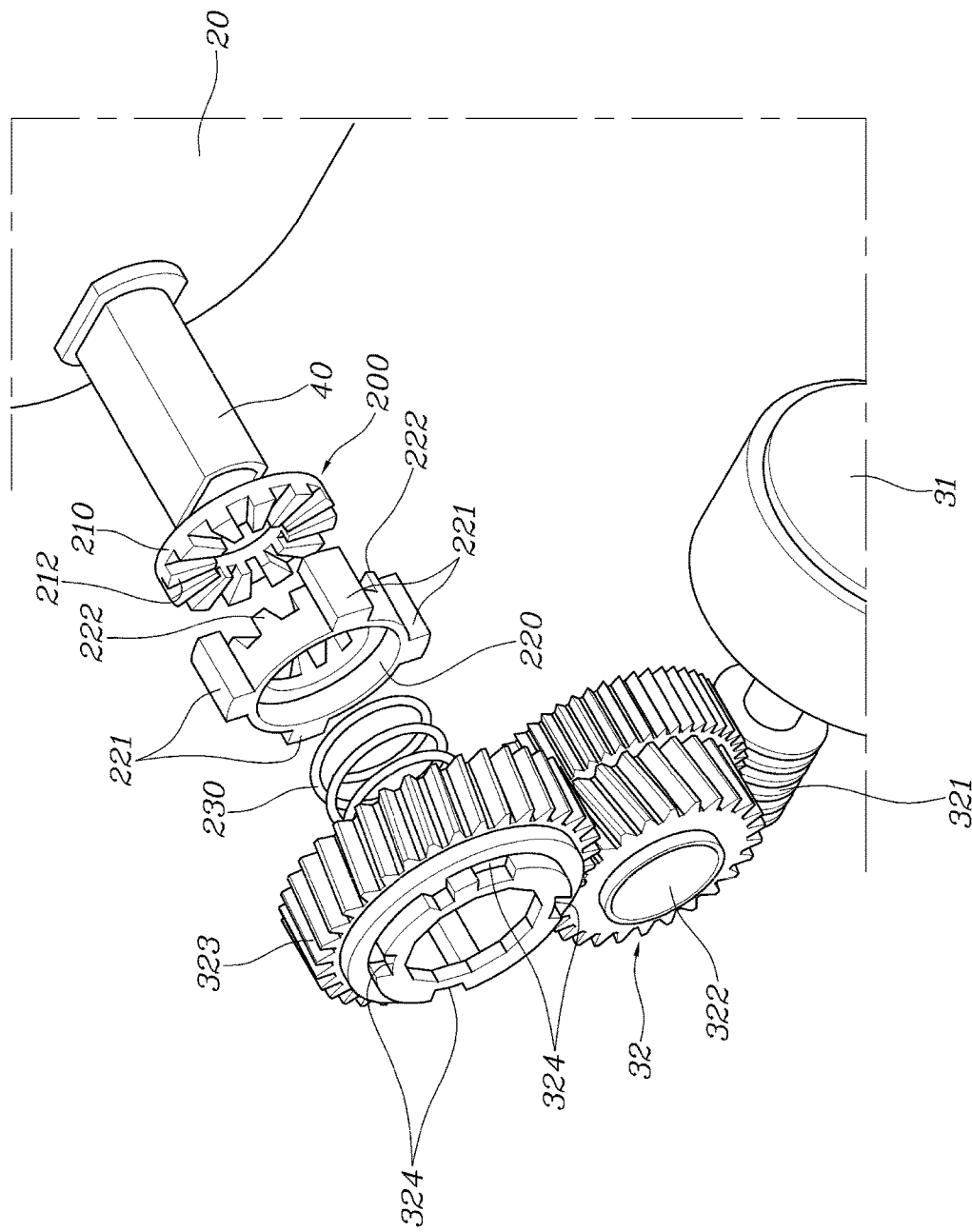
FIGS. 7 and 8 are views showing gears and a clutch assembly according to another form of the present disclosure.
Figure 8:
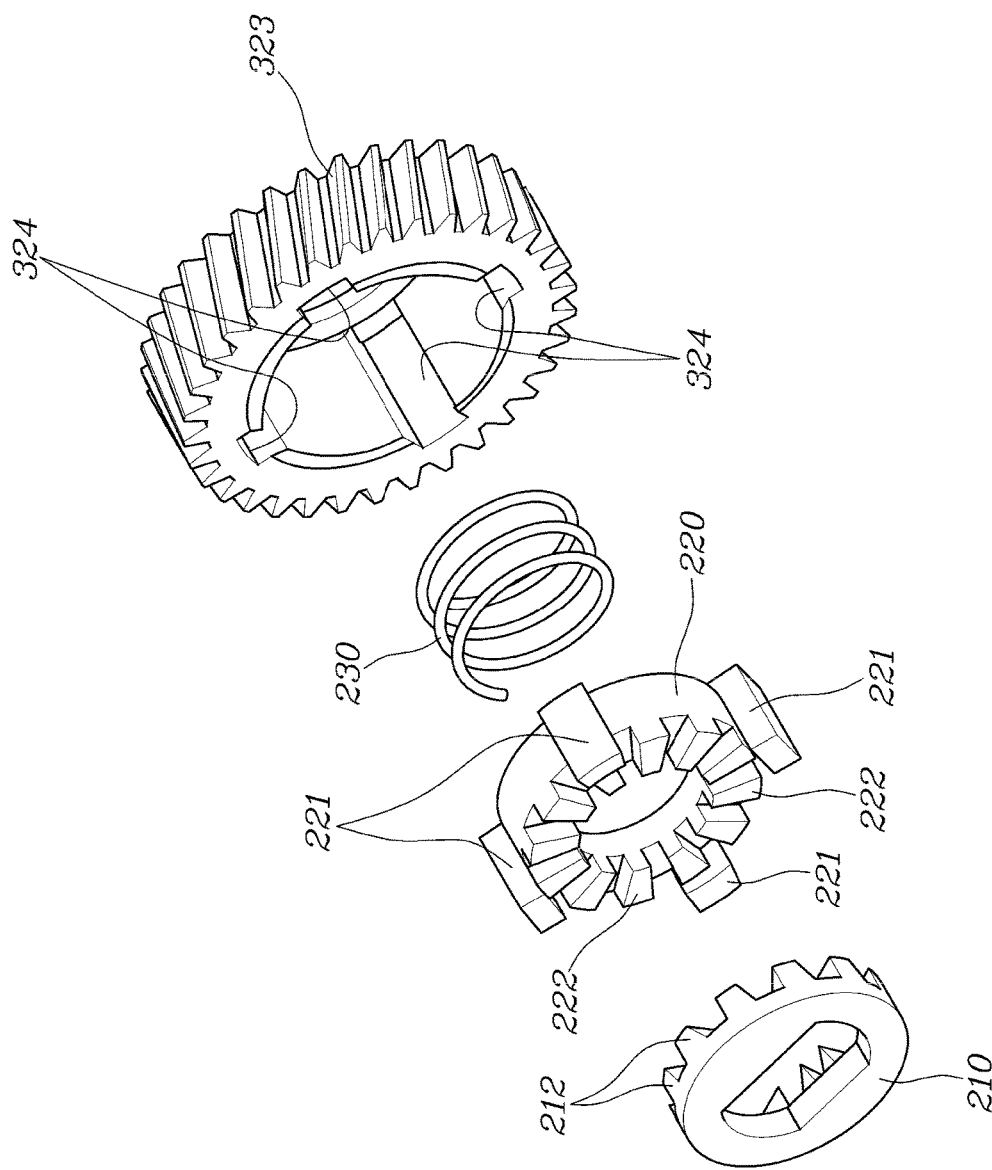
Figure 9:
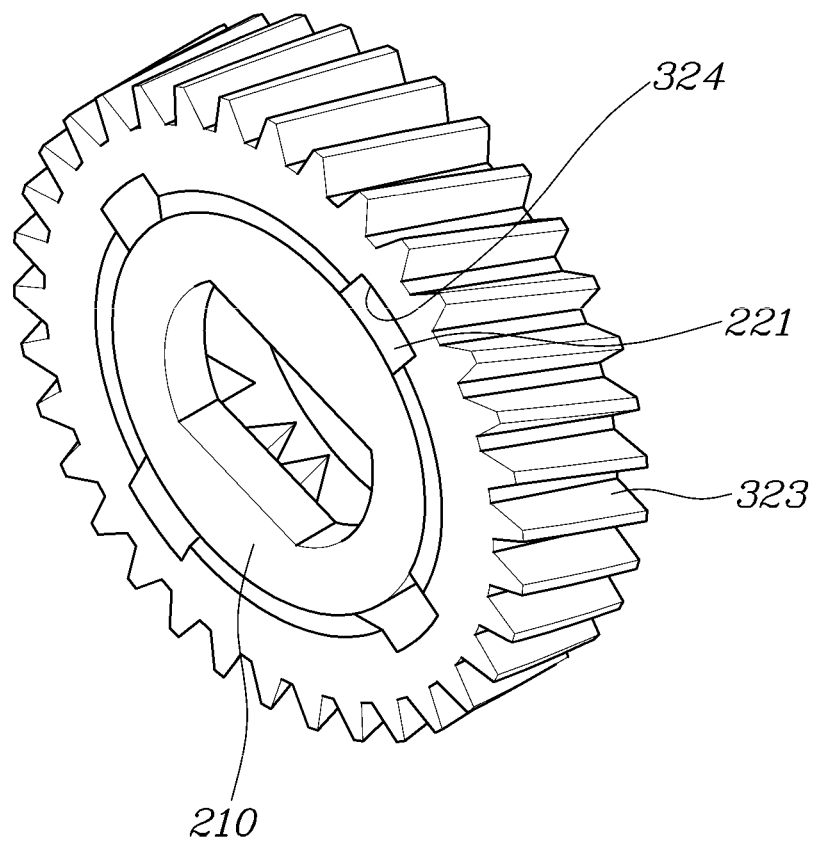
FIG. 9 is a view showing a combined state of the parts shown in FIG. 8.
Figure 10:
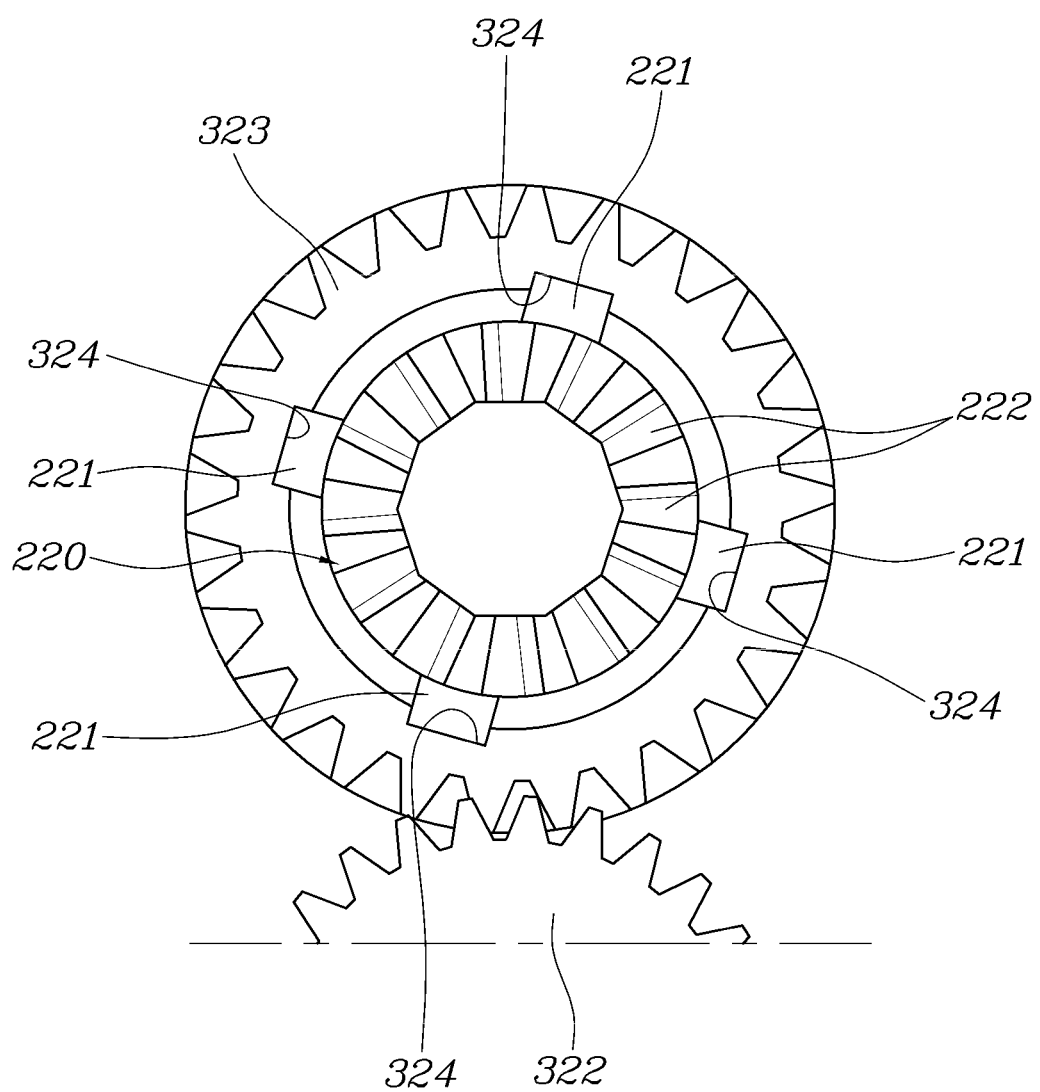
FIG. 10 is a view showing a combination structure of a final gear and a second clutch block according to one form of the present disclosure.

The design part 60, as shown in FIG. 6, may further include a display device 130 that transmits specific images through the light window 110.

It is possible to further improve visibility by transmitting an image set by a user through the display device 130.

The display device 130 may be fixed to the light window 110 or the diffuser 120 and the operation of the display device 130 may be controlled by the first PCB 90.

The actuating unit 30 includes a motor 31 fixed to the housing 10, a plurality of gears 32 connecting the motor 31 and the rotary shaft 40 to each other and transmitting power of the motor 31 to the rotary shaft, and a second PCB 33 fixed to the housing 10 and controlling the operation of the motor 31.

The second PCB 33 controls the motor 31 to operate when a signal is input through an input unit 140. The signal from the input unit 140 may be any one of a signal for tuning on/off the engine of a vehicle, a signal for opening/closing a window, a signal for locking/unlocking a door, a signal for changing a driving mode (a signal for switching an autonomous driving mode and a manual driving mode), and a signal for turning on/off an operation switch.

When a signal is input through the input unit 140, the motor 31 is controlled to operate by the second PCB 33 and the power of the motor 31 is transmitted to the rotary shaft 40 through the gears 32. Accordingly, the rotary shaft 40 is rotated with respect to the housing 10 and the sphere member 20 is rotated with the rotary shaft 40.

Figure 5:
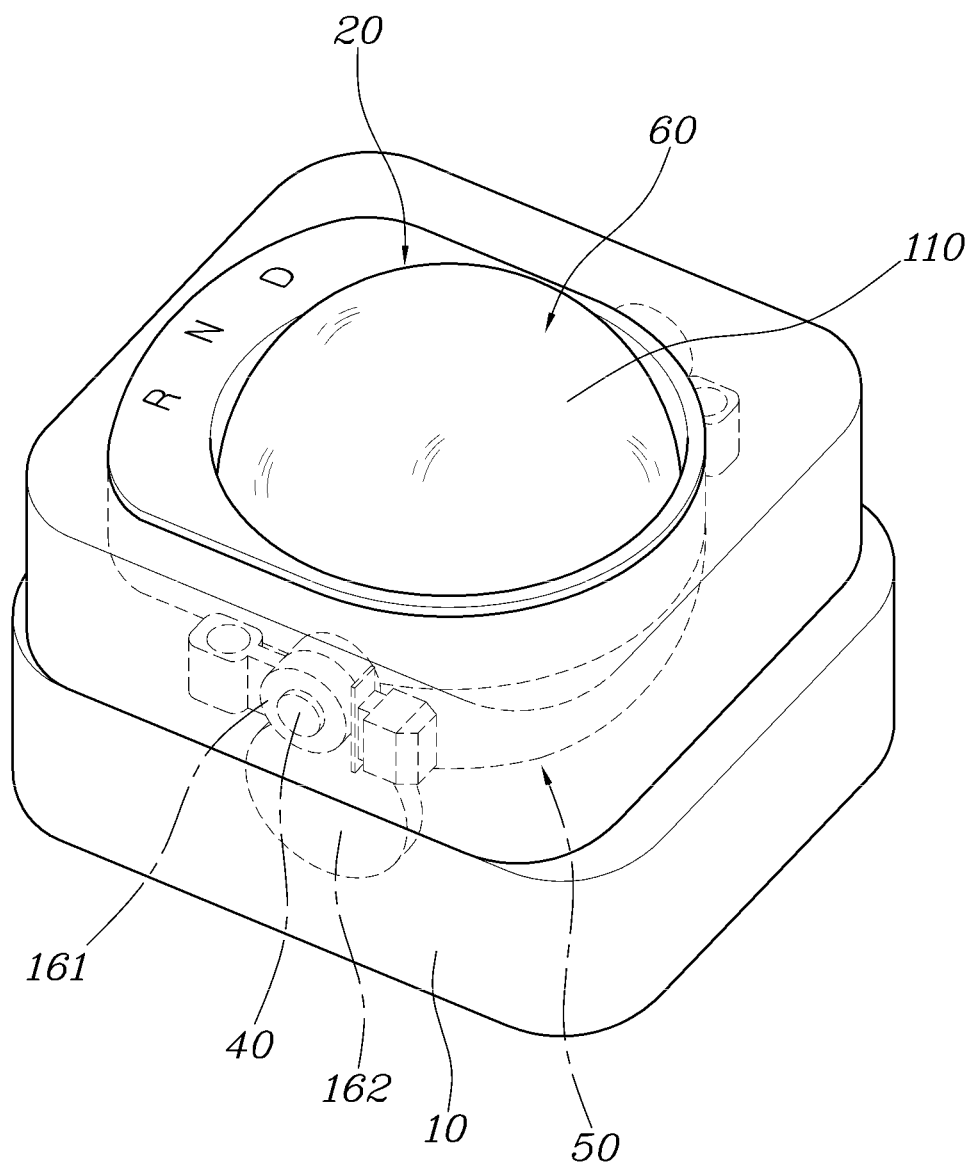
FIGS. 5 and 6 are views showing the state in which a sphere member has been rotated such that a design part is exposed.

The sphere member 20 is configured to rotate 180 degree with the rotary shaft 40 when the actuating unit 30 is operated one time. Accordingly, when the sphere member 20 is rotated, the shift part 50 is exposed to the interior of a vehicle through an opening of the housing 10, as shown in FIGS. 1 to 4, or the design part 60 is exposed to the interior of the vehicle through the opening of the housing 10, as shown in FIGS. 5 and 6.

The second PCB 33 has a Hall sensor 150 that detects rotation of the rotary shaft 40, so the second PCB 33 can more accurately control the operation of the motor 31 using a signal from the Hall sensor 150.

That is, a first gear 161 is integrally fitted on an end of the rotary shaft 40 and is engaged with a second gear 162 in a circumscription type. The central axis of the second gear 162 is fixed to the housing 10, a permanent magnet 163 is coupled to the second gear 162, and the Hall sensor 150 is disposed on the second PCB 33 to face the permanent magnet 163.

Accordingly, when the first gear 161 and the second gear 162 are rotated by rotation of the rotary shaft 40 and the position of the permanent magnet 163 is changed by rotation of the second gear 162, the Hall sensor 150 detects a change of the intensity of a magnetic field due to the change of the position of the permanent magnet 163 and the second PCB 33 can stop the operation of the motor 31 using a signal from the Hall sensor 150.

The sphere member 20 according to another form of the present disclosure is characterized by being able to be rotated with respect to the housing 10 by the power from the motor 31 or manually rotated by a user.

That is, when the sphere member 20 is rotated with respect to the housing 10 by the power from the motor 31 and rotation of the sphere member 20 stopped by holding torque of the motor 31, it may be considered as common shift lock of an auto lever.

A shift lock is a safety device that enables a shift lever to be moved to shift by intention of a user only when operation intention of the user is recognized in order to prevent misoperation, and generally includes a controller (PCB) and a motor (solenoid).

When it is impossible to release a shift lock using power from the motor due to breakdown of the controller or the motor of the shift lock, a user can forcibly manually release the shift lock using a release lever, which may be shift lock release or override.

Accordingly, the sphere member 20 should also be able to be manually rotated by a user to implement shift lock release in the sphere type shift control apparatus.

To this end, as shown in FIGS. 7 to 13, the rotary shaft 40 disposed through the center of the sphere member 20 is coupled to be rotatable with respect to the housing 10, the motor 31 is fixed to the housing 10 and connected to the gears 32, thereby being able to transmit power. In one form, a clutch assembly 200 is disposed between the gears 32 and the rotary shaft 40 to transmit power of stop power transmission.

The clutch assembly 200 maintains connection so that rotational force of the gears 32 is transmitted to the rotary shaft 40 when the gears 32 are rotated by the power from the motor 31, and cuts the connection so that rotational force of the sphere member 20 is not transmitted to the gears 32 when the sphere member 20 is manually rotated by a user.

The gears 32 may include a worm gear 321 coupled to a motor shaft, an intermediate gear 322 engaged with the worm gear 321, and a final gear 323 engaged with the intermediate gear 322, fitted on the rotary shaft 40 to rotate with the rotary shaft 40, and connected to the clutch assembly 200.

The intermediate gear 322 and the final gear 323 may be worm wheel gears to transmit power.

The clutch assembly 200 may include: a first clutch block 210 integrally fitted on the rotary shaft 40 passing through the center thereof; a second clutch block 220 fitted in the final gear 323 to integrally rotate, fitted on the rotary shaft 40 passing through the center thereof, and being able to move in the longitudinal direction of the rotary shaft 40 to be engaged with or disengaged from the first clutch block 210; and a clutch spring 230 disposed with both ends supported by the final gear 323 and the second clutch block 220.

When the second clutch block 220 is engaged with the first clutch block 210 by elasticity of the clutch spring 230, the clutch assembly 200 enters a connected state in which power can be transmitted. When the second clutch block 220 is moved toward the final gear 323 against the elasticity of the clutch spring 230 and disengaged from the first clutch block 210, the clutch assembly 200 enters a disconnected state in which power cannot be transmitted.

Several spline grooves 324 elongated in the longitudinal direction of the rotary shaft 40 are formed on the inner surface of the final gear 323, and spline protrusions 221 that are fitted in the spline grooves 324 are formed on the outer surface of the second clutch block 200 in the same number as the spline grooves 324.

Accordingly, the final gear 323 and the second clutch block 220 are integrally rotated when the spline grooves 324 and the spline protrusions 221 are fitted to each other, and the second clutch block 220 can move with respect to the final gear 323 in the longitudinal direction of the rotary shaft 40.

First protrusions 212 and second protrusions 222 that protrude toward each other are circumferentially continuously formed on the surfaces facing each other of the first clutch block 210 and the second clutch block 220, respectively.

Accordingly, when the second clutch block 220 is moved to the first clutch block 210 by the elasticity of the clutch spring 230, the second protrusions 222 are fitted between the first protrusions 212, and the first protrusions 212 are fitted between the second protrusions 222, the first clutch block 210 and the second clutch block 220 are engaged into the connected state in which power can be transmitted.

When the second clutch block 220 is moved to the final gear 323 against the elasticity of the clutch spring 230 and the first protrusions 212 and the second protrusions 222 are decoupled, the first clutch block 210 and the second clutch block 220 are disengaged into the disconnected state in which power cannot be transmitted.

The first protrusions 212 and the second protrusions 222 have inclined surfaces 212a and 222a and vertical surfaces 212b and 222b, respectively, so when the first protrusions 212 and the second protrusions 222 are fitted to each other, the inclined surfaces 212a and 222a come in contact with each other and the vertical surfaces 212b and 222b come in contact with each other.

Figure 11:
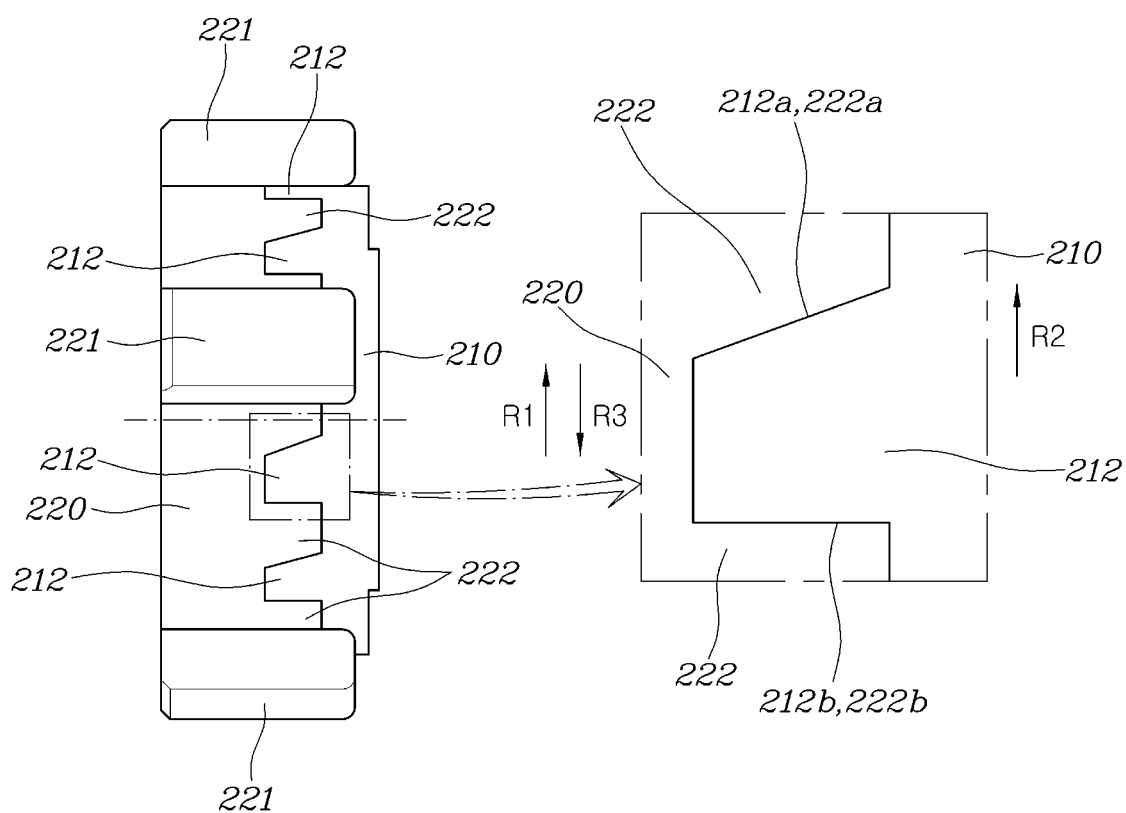
FIG. 11 is a view showing a combination structure of a first clutch block and the second clutch block according to another form of the present disclosure.
Figure 12:
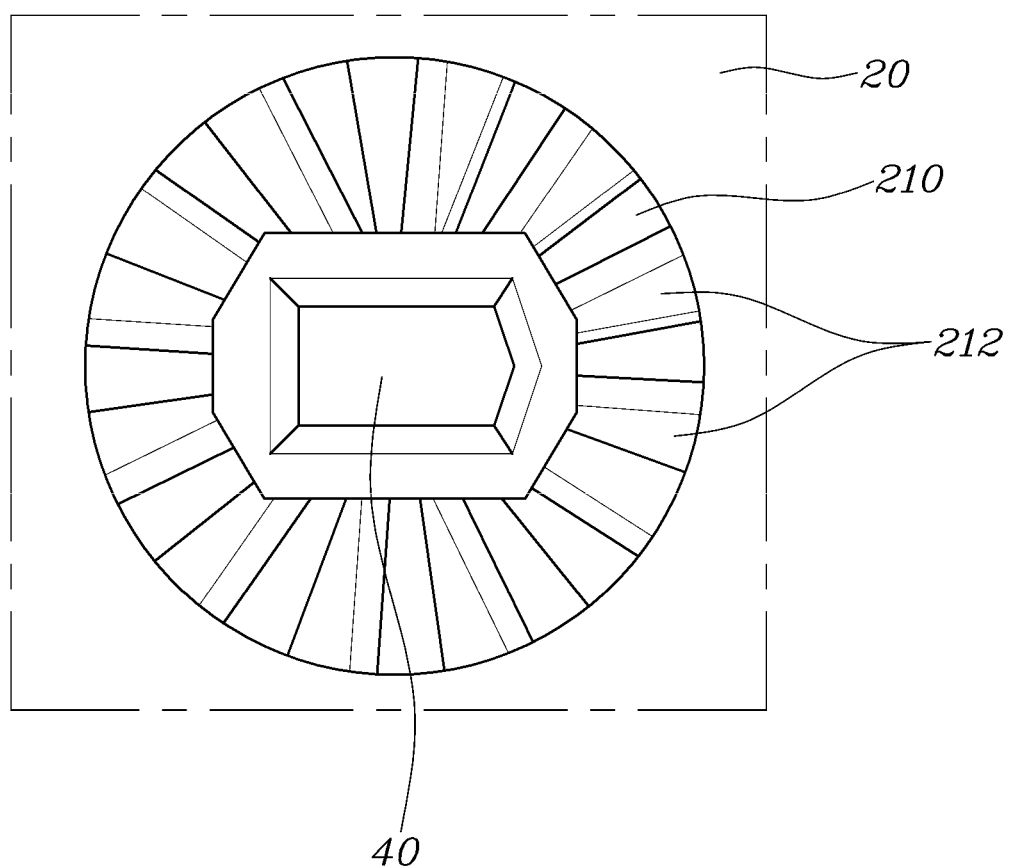
FIG. 12 is a view showing a combination structure of a rotary shaft of the sphere member and the first clutch block according to one form of the present disclosure.

Accordingly, when the rotational power of the motor 31 is transmitted to the second clutch block 220 through the gears 32 with the first protrusions 212 and the second protrusions fitted to each other, the second clutch block 220 is rotated in the direction in which the vertical surfaces 222b of the second protrusions 222 come in contact with the vertical surfaces 212b of the first protrusion 212 (the arrow R1 in FIG. 11) or is rotated in the direction in which the inclined surfaces 222a of the second protrusions 222 come in contact with the inclined surfaces 212a of the first protrusions 212 (the arrow R3 in FIG. 11). Further, the rotational force of the second clutch block 220 is transmitted to the first clutch block 210 by engagement of the first protrusions 212 and the second protrusions 222 and the rotational force of the first clutch block 210 is transmitted to the sphere member 20 through the rotary shaft 40. Accordingly, the sphere member 20 can be rotated with respect to the housing 10 by the power from the motor 31, whereby shift lock can be implemented.

According to one form, when the second clutch block 220 is rotated by the power from the motor 31, the second clutch block 220 may be rotated only in the direction in which the vertical surfaces 222b of the second protrusions 222 come in contact with the vertical surfaces 212b of the first protrusions 212 (the arrow R1 in FIG. 11). In this case, the sphere member 20 is rotated 180 degrees at one time only clockwise with respect to the rotary shaft 40, and the shifting part 50 and the design part 60 of the sphere member 20 are alternately exposed one time to the interior of a vehicle.

According to another form, when the second clutch block 220 is rotated by the power from the motor 31, the second clutch block 220 may be rotated 180 degrees in the direction in which the vertical surfaces 222b of the second protrusions 222 come in contact with the vertical surfaces 212b of the first protrusions 212 (the arrow R1 in FIG. 11). In this case, the sphere member 20 is rotated 180 degrees clockwise with respect to the rotary shaft 40, so the shifting part 50 is exposed to the interior of a vehicle (the engine of the vehicle that has been turned off is turned on). When the second clutch block 220 is rotated 180 degrees in the opposite direction in which the inclined surfaces 222a of the second protrusions 222 come in contact with the inclined surfaces 212a of the first protrusions 212 with the shifting part 50 exposed to the interior of a vehicle (the arrow R3 in FIG. 11), the sphere member 20 is rotated 180 degrees counterclockwise with respect to the rotary shaft 40, so the design part 60 is exposed to the interior of the vehicle (the engine that has been turned on is turned off).

Since the torque of the motor 31 is larger than the spring force of the clutch spring 230, the first clutch block 210 and the second clutch block 220 are not spaced from each other when the second clutch block 220 is rotated in the opposite direction in which the inclined surfaces 222a of the second protrusions 222 come in contact with the inclined surfaces 212a of the first protrusions 212. Accordingly, the first protrusions 212 and the second protrusions 222 keep engaged with each other, so the rotational force of the second clutch block 220 is transmitted to the first clutch block 210 and the rotational force of the first clutch block 210 is transmitted to the sphere member 20 through the rotary shaft 40. Therefore, the sphere member 20 can be rotated with respect to the housing 10 by the power from the motor 31.

Figure 13:
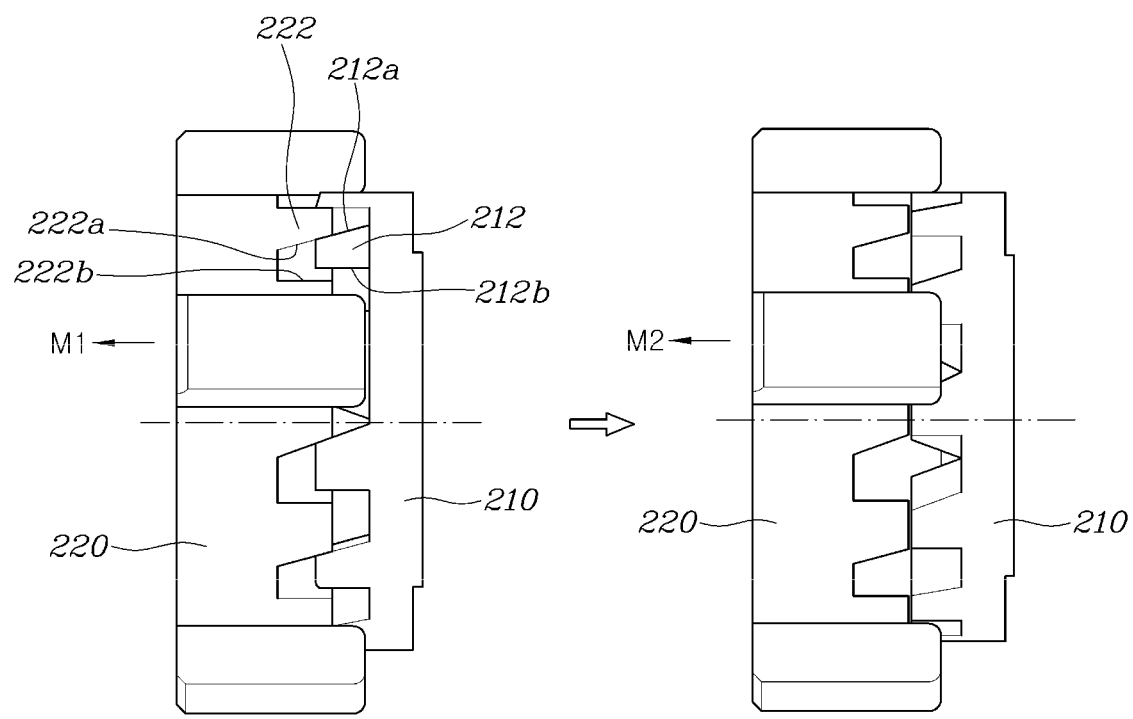
FIG. 13 is a view showing the state in which the first clutch block and the second clutch block has been disconnected by a user manually rotating the sphere member in one form of the present disclosure.

When the sphere member 20 is manually rotated by a user in the direction in which the inclined surfaces 212a of the first protrusions 212 come in contact with the inclined surfaces 222a of the second protrusions 222 (the arrow R2 in FIG. 11) with the first protrusions 212 and the second protrusions 222 fitted to each other, the inclined surfaces 212a of the first protrusions 212 move on the inclined surfaces 222a of the second protrusions 222. Accordingly, as shown in FIG. 13, the second clutch block 220 is moved to the final gear against the elasticity of the clutch spring 230 (the arrows M1 and M2 in FIG. 13), and the first protrusions 212 and the second protrusions 222 are separated from each other by the movement of the second clutch block 220. Therefore, the first clutch block 210 and the second clutch block 220 are disengaged from each other into the disconnected state in which power cannot be transmitted. Further, in this case, the user can manually rotate the sphere member 20 with respect to the housing 10, so the function of a shift lock can be implemented.

As described above, the sphere type shift control apparatus in some forms of the present disclosure includes a shifting part, which is operated by a user to shift, at one semispherical side of the sphere member 20 and the design part 60 at the opposite semispherical side for indirect lighting and image transmission. Further, when it is required to shift by rotating the sphere member 20, only the shifting part 50 is exposed to the interior of a vehicle through the opening of the housing 10, and when it is not required to shift, only the design part 60 is exposed to the interior of the vehicle through the opening of the housing 10. Accordingly, it is possible to improve stability by improving visibility and to improve the commercial value by implementing a high-tech image.

Further, according to the present disclosure, since the sphere member 20 is rotated with respect to the housing 10 by the power from the motor 31 and the rotation of the sphere member 20 is restricted by holding torque of the motor 31, it is possible to implement a shift lock. Further, since a user can forcibly manually rotate the sphere member 20, the function of shift lock release can be implemented, so safety can be improved.

Although the present disclosure was described with reference to specific forms shown in the drawings, it is apparent to those skilled in the art that the present disclosure may be changed and modified in various ways without departing from the scope of the present disclosure.

What is claimed is:

1. A sphere shift control apparatus for an electronic shift system, the sphere shift control apparatus comprising:
a housing;
a sphere member rotatably coupled to the housing and including:
a shifting part disposed at a first semispherical side, and
a design part disposed at a second semispherical side opposite to the first semispherical side;
a rotary shaft disposed through a center of the sphere member and rotatably coupled to the housing;
gears connected to a motor; and
a clutch assembly disposed between the gears and the rotary shaft and configured to selectively transmit power from the motor,
wherein the sphere member is rotated with respect to the housing by the power from the motor or is manually rotated by a user,
wherein the gears include:
a worm gear coupled to a motor shaft;
an intermediate gear engaged with the worm gear; and
a final gear engaged with the intermediate gear, fitted on the rotary shaft passing through a center thereof to rotate with respect to the rotary shaft, and connected to the clutch assembly, and
wherein the clutch assembly includes:
a first clutch block integrally fitted on the rotary shaft passing through a center thereof;
a second clutch block fitted in the final gear to integrally rotate, fitted on the rotary shaft passing through the center thereof, and configured to move in a longitudinal direction of the rotary shaft to be engaged with or disengaged from the first clutch block; and
a clutch spring disposed with both ends supported by the final gear and the second clutch block.

2. The sphere shift control apparatus of claim 1, wherein the clutch assembly is configured to maintain a connected state so that rotational force of the gears is transmitted to the rotary shaft when the gears are rotated by the power from the motor.

3. The sphere shift control apparatus of claim 1, wherein when the clutch assembly is disengaged, a rotational force of the sphere member is not transmitted to the gears.

4. The sphere shift control apparatus of claim 1, wherein when the second clutch block is engaged with the first clutch block by an elasticity of the clutch spring, the clutch assembly is configured to enter a connected state to transmit the power; and
when the second clutch block is moved toward the final gear against an elastic force of the clutch spring and disengaged from the first clutch block, the clutch assembly is configured to enter a disconnected state in which the power cannot be transmitted.

5. The sphere shift control apparatus of claim 1, wherein:
several spline grooves elongated in the longitudinal direction of the rotary shaft are formed on an inner surface of the final gear;
spline protrusions that are fitted in the spline grooves are formed on an outer surface of the second clutch block in the same number as the spline grooves; and
the final gear and the second clutch block are integrally rotated when the spline grooves and the spline protrusions are fitted to each other, and the second clutch block is configured to move with respect to the final gear in the longitudinal direction of the rotary shaft.

6. The sphere shift control apparatus of claim 1, wherein:
first protrusions and second protrusions that protrude toward each other are circumferentially continuously formed on surfaces facing each other of the first clutch block and the second clutch block, respectively;
when the second clutch block is moved to the first clutch block by an elastic force of the clutch spring, the second protrusions are fitted between the first protrusions, and the first protrusions are fitted between the second protrusions, the first clutch block and the second clutch block are engaged into a connected state in which the power is transmitted; and
when the second clutch block is moved to the final gear against the elastic force of the clutch spring and the first protrusions and the second protrusions are decoupled, the first clutch block and the second clutch block are disengaged and enter into a disconnected state in which the power cannot be transmitted.

7. The sphere shift control apparatus of claim 6, wherein the first protrusions and the second protrusions have inclined surfaces and vertical surfaces, respectively, such that when the first protrusions and the second protrusions are fitted to each other, the inclined surfaces come in contact with each other and the vertical surfaces come in contact with each other.

8. The sphere shift control apparatus of claim 7, wherein when rotational power of the motor is transmitted to the second clutch block through the gears with the first protrusions and the second protrusions fitted to each other,
the second clutch block is rotated in a direction in which the vertical surfaces of the second protrusions come in contact with the vertical surfaces of the first protrusions or is rotated in a direction in which the inclined surfaces of the second protrusions come in contact with the inclined surfaces of the first protrusions,
a rotational force of the second clutch block is transmitted to the first clutch block by engagement of the first protrusions and the second protrusions, and
a rotational force of the first clutch block is transmitted to the sphere member through the rotary shaft, such that the sphere member is rotated with respect to the housing by the power from the motor.

9. The sphere shift control apparatus of claim 8, wherein when the second clutch block is rotated by the power from the motor only in the direction in which the vertical surfaces of the second protrusions come in contact with the vertical surfaces of the first protrusions, the sphere member is rotated 180 degrees clockwise one time with respect to the rotary shaft, and the shifting part and the design part of the sphere member are alternately exposed to an interior of a vehicle.

10. The sphere shift control apparatus of claim 8, wherein when the second clutch block is rotated 180 degrees by the power from the motor in the direction in which the vertical surfaces of the second protrusions come in contact with the vertical surfaces of the first protrusions, the sphere member is rotated 180 degrees clockwise with respect to the rotary shaft and the shifting part is exposed to an interior; and
when the second clutch block is rotated 180 degrees in an opposite direction in which the inclined surfaces of the second protrusions come in contact with the inclined surfaces of the first protrusions with the shifting part exposed to the interior, the sphere member is rotated 180 degrees counterclockwise with respect to the rotary shaft and the design part is exposed to the interior.

11. The sphere shift control apparatus of claim 10, wherein when a torque of the motor is greater than the elastic force of the clutch spring, the first clutch block and the second clutch block are not spaced from each other when the second clutch block is rotated in the opposite direction in which the inclined surfaces of the second protrusions come in contact with the inclined surfaces of the first protrusions, the first protrusions and the second protrusions keep engaged with each other, and the rotational force of the second clutch block is transmitted to the first clutch block.

12. The sphere shift control apparatus of claim 7, wherein when the sphere member is manually rotated by the user in the direction in which the inclined surfaces of the first protrusions come in contact with the inclined surfaces of the second protrusions with the first protrusions and the second protrusions fitted to each other, the inclined surfaces of the first protrusions are configured to move on the inclined surfaces of the second protrusions and the second clutch block is moved to the final gear against the elastic force of the clutch spring; and the first protrusions and the second protrusions are separated from each other by the movement of the second clutch block, and the first clutch block and the second clutch block are disengaged from each other and enter into the disconnected state in which the power cannot be transmitted, such that the sphere member is manually rotated with respect to the housing.

\* \* \* \* \*